US009519958B2

(12) United States Patent
Senzaki et al.

(10) Patent No.: US 9,519,958 B2
(45) Date of Patent: *Dec. 13, 2016

(54) IMAGE PROCESSING METHOD AND IMAGE PROCESSING DEVICE WITH PIXEL CORRECTION

(71) Applicant: NEC Corporation, Tokyo (JP)

(72) Inventors: Kenta Senzaki, Tokyo (JP); Masato Tsukada, Tokyo (JP); Hiroaki Kawaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 8 days.

This patent is subject to a terminal disclaimer.

(21) Appl. No.: 14/396,061

(22) PCT Filed: Apr. 24, 2013

(86) PCT No.: PCT/JP2013/061970
§ 371 (c)(1),
(2) Date: Oct. 22, 2014

(87) PCT Pub. No.: WO2013/161840
PCT Pub. Date: Oct. 31, 2013

(65) Prior Publication Data
US 2015/0086129 A1 Mar. 26, 2015

(30) Foreign Application Priority Data

Apr. 26, 2012 (JP) .................................. 2012-100911

(51) Int. Cl.
*G06K 9/40* (2006.01)
*G06T 5/00* (2006.01)
(Continued)

(52) U.S. Cl.
CPC ................. *G06T 5/20* (2013.01); *G06T 5/002* (2013.01); *H04N 5/2173* (2013.01); *H04N 5/357* (2013.01);
(Continued)

(58) Field of Classification Search
None
See application file for complete search history.

(56) References Cited

U.S. PATENT DOCUMENTS 8,059,910 B2 * 11/2011 Ishiga ...................... G06T 5/10
382/260
8,351,735 B2 * 1/2013 Biezen .................. H04N 1/4072
382/260
(Continued)

FOREIGN PATENT DOCUMENTS

| JP | 2002-057900 | 2/2002 |
|---|---|---|
| JP | 2002-183727 | 6/2002 |

(Continued)

OTHER PUBLICATIONS

International Search Report PCT/JP2013/061970 dated Jul. 16, 2013.
(Continued)

*Primary Examiner* — Randolph I Chu
(74) *Attorney, Agent, or Firm* — Young & Thompson

(57) ABSTRACT

A method includes: calculating a pixel statistical value and edge of pixels for each of areas of a multi-layer, the areas each containing a target pixel and having a successively decreased range; correcting the edge based on a pixel statistical value of an area that is wider than a specific area; correcting difference between a pixel statistical value of the specific area and the pixel statistical value of the area that is wider than the specific area using the post-correction edge; correcting the pixel statistical value of the specific area using (Continued)

post-correction difference and the pixel statistical value of the area that is wider than the specific area; and correcting the target pixel by repeating correction of the pixel statistical value of the specific area successively in each area until the area reduces its range from the maximum range to the minimum range.

20 Claims, 6 Drawing Sheets

(51) Int. Cl.
*G09G 1/14* (2006.01)
*G09G 3/28* (2013.01)
*G09G 3/30* (2006.01)
*G09G 5/00* (2006.01)
*G09G 5/02* (2006.01)
*G09G 5/10* (2006.01)
*G06T 5/20* (2006.01)
*H04N 5/217* (2011.01)
*H04N 5/357* (2011.01)

(52) U.S. Cl.
CPC .............. *G06T 2207/20016* (2013.01); *G06T 2207/20076* (2013.01)

(56) References Cited

U.S. PATENT DOCUMENTS

| | | | |
|---|---|---|---|
| 9,135,685 B2* | 9/2015 | Senzaki | G06T 5/002 |
| 2002/0076118 A1 | 6/2002 | Kaji | |
| 2014/0205202 A1* | 7/2014 | Toda | H04N 1/409 |
| | | | 382/275 |
| 2015/0086130 A1* | 3/2015 | Senzaki | G06T 5/002 |
| | | | 382/266 |
| 2015/0098656 A1* | 4/2015 | Senzaki | G06T 5/002 |
| | | | 382/194 |
| 2015/0363666 A1* | 12/2015 | Senzaki | H04N 1/409 |
| | | | 382/199 |

FOREIGN PATENT DOCUMENTS

| | | |
|---|---|---|
| JP | 2007-018379 | 1/2007 |
| JP | 2011-041183 | 2/2011 |

OTHER PUBLICATIONS

Extended European Search Report—EP 13 78 1942—Feb. 10, 2016.
Rosito Jung: "Adaptive image denoising and edge enhancement in scale-space using the wavelet transform", Pattern recognition letters, Elsevier, Apr. 2003, pp. 1-15.

* cited by examiner

IMAGE PROCESSING METHOD AND IMAGE PROCESSING DEVICE WITH PIXEL CORRECTION

TECHNICAL FIELD

The present invention relates to an image processing method and an image processing device.

BACKGROUND ART

In the image processing technology, specifically, a technology for reducing random noise contained in an image is essential to sharp reproduction of a captured image. A typical technology for reducing random noise is disclosed, for example, in Patent Literature 1.

Patent Literature 1 discloses the following technology. That is, an apparatus includes a plurality of arithmetic circuits for calculating a moving average pixel number (n) based on a specified mathematical formula with respect to an arbitrary target pixel (i) in a main scanning direction of a color digital signal output from an input image processing circuit, a plurality of bit selector circuits for selectively outputting the target pixel (i) and reference pixels (j) preceding and following (n) pixels, a plurality of difference circuits for calculating absolute values of the differences between an output level of the target pixel (i) and an output level of each of the reference pixels (j), a plurality of judging circuits for outputting the target pixel (i), comparing the values output from the plurality of difference circuits with a specified threshold in a threshold memory, to output the reference pixels (j) based on the comparison result, and a plurality of arithmetic circuits for performing the moving average processing of output signals from the plurality of judging circuits.

More specifically, only in a case where an absolute value of the difference between the output level of the target pixel (i) and the output level of the reference pixel (j) is equal to or less than the threshold, the reference pixel (j) is added to the moving average processing. As a result, a portion where the absolute value of the difference varies sharply over the threshold is excluded from the moving average processing. This ensures effective removal of noise components.

CITATION LIST

Patent Literature

[Patent Literature 1]
Japanese Unexamined Patent Application, First Publication No. 2002-57900

SUMMARY OF INVENTION

Technical Problem

However, with the technology of Patent Literature 1, it was impossible to remove low frequency noise with periodicity equal to or more than a size of a smoothing filter.

Further, there was a possibility of insufficient noise reduction performance in a low-brightness region in an image where noise components are easily noticeable.

The present invention was made to solve the above described problem A purpose of the present invention is to provide an image processing method for improving noise reduction performance in a low-brightness region where noise components are easily noticeable and an image processing device.

Solution to Problem

The present invention is directed to an image processing method including: calculating a pixel statistical value and edge information of pixels for each of areas of a multi-layer, the areas each containing a target pixel and having a successively decreased range; correcting difference information between a pixel statistical value of an area of a specific layer and a pixel statistical value of an area of a layer that is wider than the area of the specific layer using the edge information; correcting the pixel statistical value of the area of the specific layer using post-correction difference information, the pixel statistical value of the area that is wider than the area of the specific layer, and a pixel statistical value of an area that is wider than the areas of other layers; and correcting the target pixel by repeating correction and recorrection of the pixel statistical value of the area of the specific layer successively in each layer until the area reduces its range from the maximum range to the minimum range.

The present invention is directed to an image processing device including: a pixel statistical value calculation unit calculating a pixel statistical value of pixels for each of areas of a multi-layer, the areas each containing a target pixel and having a successively decreased range; an edge information calculation unit calculating edge information for each of the areas of the multi-layer, the areas each containing a target pixel and having a successively decreased range; and a correction unit correcting difference information between a pixel statistical value of an area of a specific layer and a pixel statistical value of an area of a layer that is wider than the area of the specific layer using the edge information, correcting the pixel statistical value of the area of the specific layer using post-correction difference information, the pixel statistical value of the area that is wider than the area of the specific layer, and a pixel statistical value of an area that is wider than the areas of other layers, and correcting the target pixel by repeating correction and recorrection of the pixel statistical value of the area of the specific layer sequentially in each layer until the area reduces its range from the maximum range to the minimum range.

Advantageous Effect of Invention

According to an aspect of the present invention, it is possible to effectively remove noise in a low-brightness region where noise components are easily noticeable.

DESCRIPTION OF EMBODIMENTS

An embodiment of the present invention will be described below.

Figure 1:
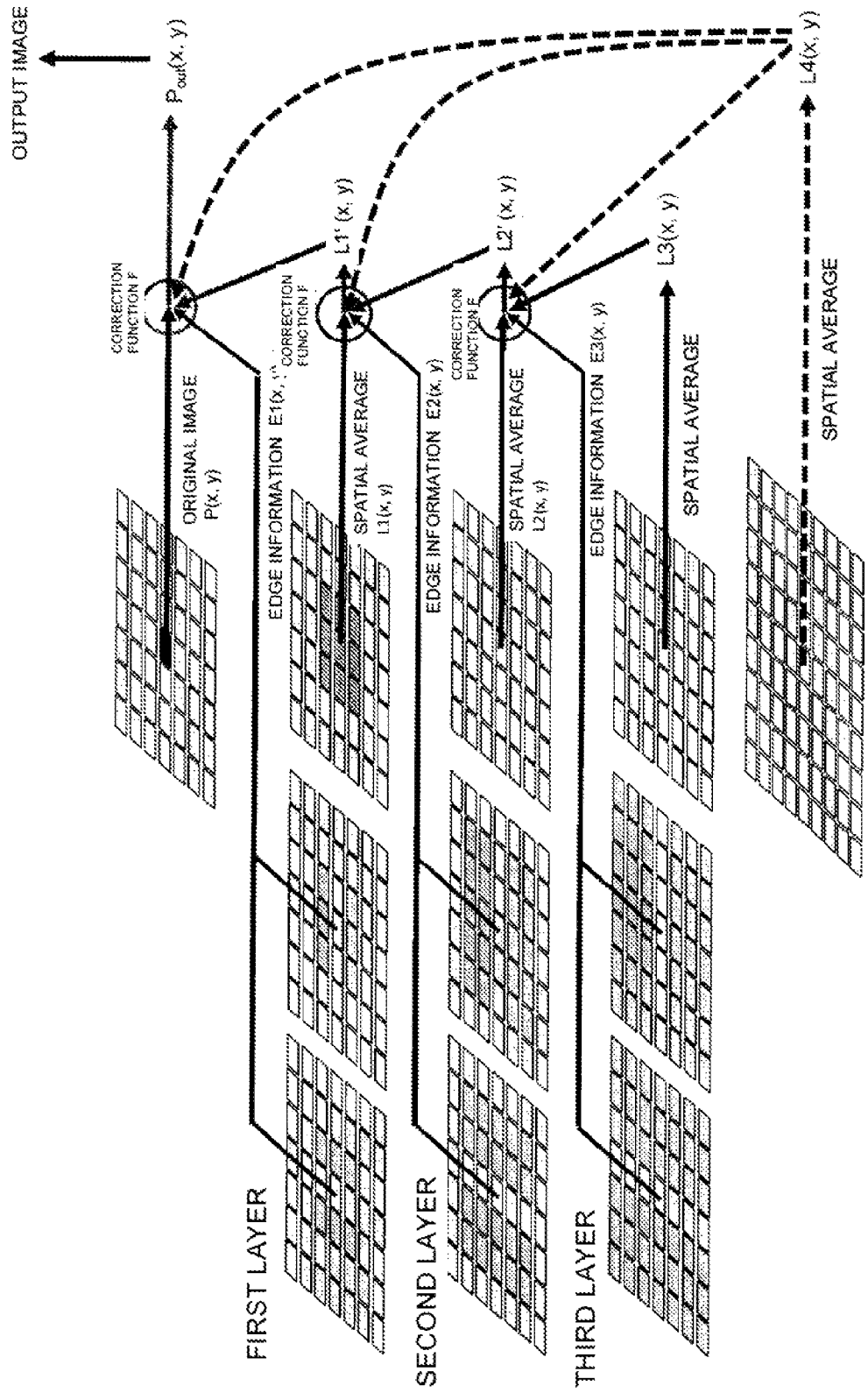
FIG. 1 illustrates processing according to an embodiment of the present invention.

FIG. 1 illustrates an image processing method according to the embodiment of the present invention. FIG. 1 illustrates a flow of multi-resolution image processing for a three-layer structure. However, it is possible to apply the present invention to multi-resolution image processing for a two-layer structure. It is further possible to apply the present invention to multi-resolution image processing for a four-layer structure with ease.

FIG. 1 illustrates the image processing method according to an embodiment of the present invention.

According to the embodiment of the present invention, a spatial average (L2 (x, y)) in an medium area is corrected using a spatial average L3 (x, y) as a pixel statistical value of a space in a wide area, edge information in the wide area or an edge amount E3 (x, y) of the wide area, and a spatial average L4 (x, y) as an pixel statistical value of a space that has a range equal to or more than the wide area, the wide area including a pixel location (x, y) (target pixel) at a center thereof. Then, a spatial average (L1 (x, y)) of a narrow area is corrected using a post-correction spatial average (L2' (x, y)) in the medium area, an edge amount (E2 (x, y)) in the medium area, and the spatial average L4 (x, y). A sequential processing of the corrections ensures correction of an input pixel value $P_{in}$ (x, y) and obtainment of an output pixel value $P_{out}$ (x, y).

Here, the pixel statistical value is a spatial average of a target area. Examples of the spatial average include an arithmetic mean, a geometric mean, and a weighted average efficiency of pixels existing in areas. Given that the pixel statistical value is the spatial average, in the following description, a case where the spatial average is the arithmetic mean of pixels in areas will be described, below. Further, the edge amount or the edge information is to be defined by a difference value of the statistic amounts (e.g., mean values and medians) of pixels between areas, the pixels being respectively positioned upward, downward, left-side, and right-side of the target pixel (input pixel). In the following description, similar to the pixel statistical value, a case where the edge amount is a difference between the spatial averages will be described.

A specific processing will be described below. In FIG. 1, flows of processing at respective layers are identical to each other except for a parameter for determining a correction amount. As an example, processing for correcting the spatial average L2 (x, y) in the medium area using the spatial average L3 (x, y) in the wide area, the edge amount E3 (x, y) in the wide area, and the spatial average L4 (x, y) as the pixel statistical value of the area that has a range equal to or more than the wide area will be described below in detail.

Initially, the spatial average L3 (x, y) of the wide area (range between −k3 and k3), the spatial average L2 (x, y) of the medium area (range between −k2 and k2), and the spatial average L4 (x, y) of the area (range between −k4 and k4) that has a range equal to or more than the wide area at each pixel location (x, y) are calculated according to a formula (1), a formula (2), and a formula (3), respectively. Here, a range of each of the area that has a range equal to or more than the wide area, the wide area and the medium area is designated by the respective same pixel numbers in a vertical axis and a horizontal axis, i.e., designated by k4, k3, and k2, respectively. However, the pixel numbers are not necessarily the same in the vertical axis and the horizontal axis.

$$L3(x, y) = \frac{1}{(2 \cdot k3 + 1)^2} \sum_{i=-k3}^{k3} \sum_{j=-k3}^{k3} P_{in}(x+i, y+j) \quad (1)$$

$$L2(x, y) = \frac{1}{(2 \cdot k2 + 1)^2} \sum_{i=-k2}^{k2} \sum_{j=-k2}^{k2} P_{in}(x+i, y+j) \quad (2)$$

$$L4(x, y) = \frac{1}{(2 \cdot k4 + 1)^2} \sum_{i=-k4}^{k4} \sum_{j=-k4}^{k4} P_{in}(x+i, y+j) \quad (3)$$

Here, k4>=k3 is satisfied.

Next, the edge amount E3 (x, y) in the wide area will be calculated. In the calculation of the edge amount, initially, an edge amount EV3 (x, y) in the vertical direction and an edge amount EH3 (x, y) in the horizontal direction are calculated according to a formula (4) and a formula (5), respectively. Resulting values are added according to a formula (6) to thereby obtain the edge amount E3 (x, y) in the wide area. Here, the range of the wide area is designated by the same pixel numbers, e.g., k3, in the vertical axis and the horizontal axis. However, it is not essential to designate the range by the same pixel numbers in the vertical axis and the horizontal axis.

$$EV3(x, y) = \quad (4)$$
$$\frac{1}{(2 \cdot K3 + 1) \cdot k3} \left| \sum_{i=-k3}^{k3} \sum_{j=1}^{k3} (P_{in}(x+i, y+j) - P_{in}(x+i, y-j)) \right|$$

$$EH3(x, y) = \quad (5)$$
$$\frac{1}{(2 \cdot K3 + 1) \cdot k3} \left| \sum_{j=1}^{k3} \sum_{i=-k3}^{k3} (P_{in}(x+i, y+j) - P_{in}(x-i, y+j)) \right|$$

$$E3(x, y) = EV3(x, y) + EH3(x, y) \quad (6)$$

Subsequently, the spatial average L3 (x, y) in the wide area is corrected according to a formula (7) using a composed weight α3 (x, y) that is calculated from thus calculated edge amount E3 (x, y) to obtain a post-correction spatial average L3' (x, y) in the wide area. The composed weight α3 (x, y) is calculated according to a formula (8) using preliminary set thresholds hi3 and lo3.

$$L3''(x, y) = (1 - \alpha3(x, y)) \cdot L3(x, y) + \alpha3(x, y) \cdot L2(x, y) \quad (7)$$

$$\alpha3(x, y) = \begin{cases} 1.0 & \text{if } E3(x, y) > hi3 \\ 0.0 & \text{elseif } E3(x, y) < lo3 \\ \frac{E3(x, y) - lo3}{hi3 - lo3} & \text{else} \end{cases} \quad (8)$$

Here, according to the present embodiment, a correction amount calculated by a correction function Func for noise suppression is further corrected using the spatial average L4 (x, y) and two thresholds τ1 and τ2 and parameters γ1 and γ2 relating to the spatial average L4 (x, y). As a result, the spatial average L2' (x, y) of the medium area is output. This processing is represented by the following formula (9).

$$L2'(x,y)=L3''(x,y)+\text{Func2}(L4(x,y),\tau 1,\tau 2,\gamma 1,\gamma 2)\times \text{Func}(L2(x,y)-L3''(x,y)) \quad (9)$$

Figure 2:
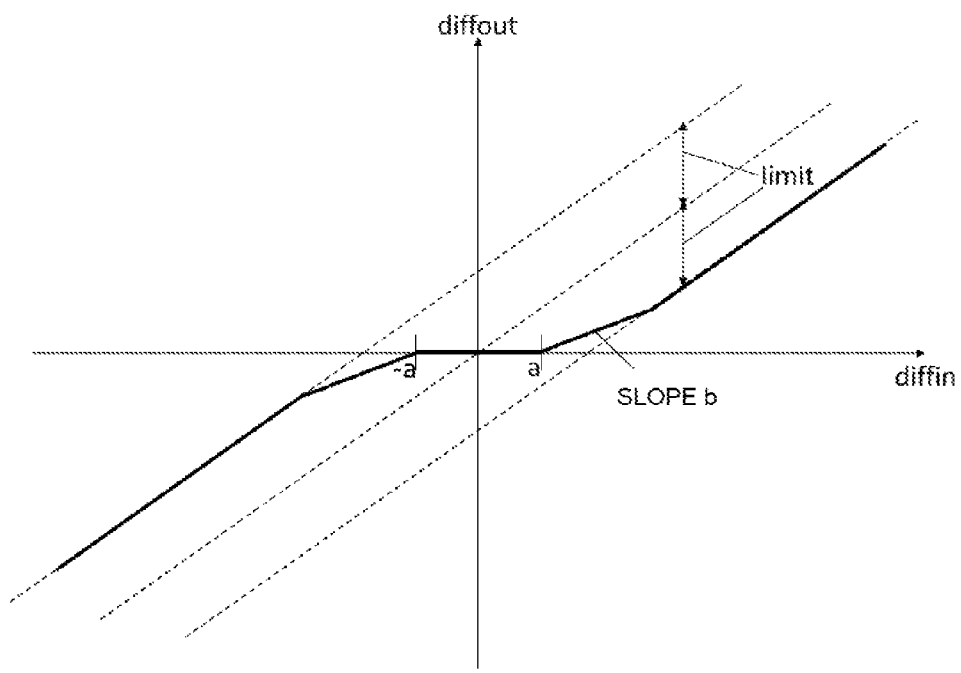
FIG. 2 is an exemplary diagram illustrating a correction function Func.

The Func function of FIG. 2 is used as an example of a correction function Func. For example, in the correction of the spatial average L2 (x, y) of the medium area at the pixel location (x, y), it is provided that diffin is (L2 (x, y)−L3" (x, y)) and diffout obtainable by the correction function of FIG. 2 is a correction amount calculated by the correction function Func. Parameters a, b, and limit in the correction function of FIG. 2 are decided for a resolution to be processed and for each color component to be corrected.

Further, an example of the correction function Func 2 in the formula (9) is shown by the following formula (10).

$$\text{Func2}(l, \tau 1, \tau 2, \gamma 1, \gamma 2) = \begin{cases} \gamma 2 & \text{if } l > \tau 2 \\ \gamma 1 & \text{else if } l < \tau 1 \\ \left(\frac{l-\tau 1}{\tau 2-\tau 1} \times (\gamma 2 - \gamma 1) + \gamma 1\right) & \text{else} \end{cases} \quad (10)$$

Figure 3:
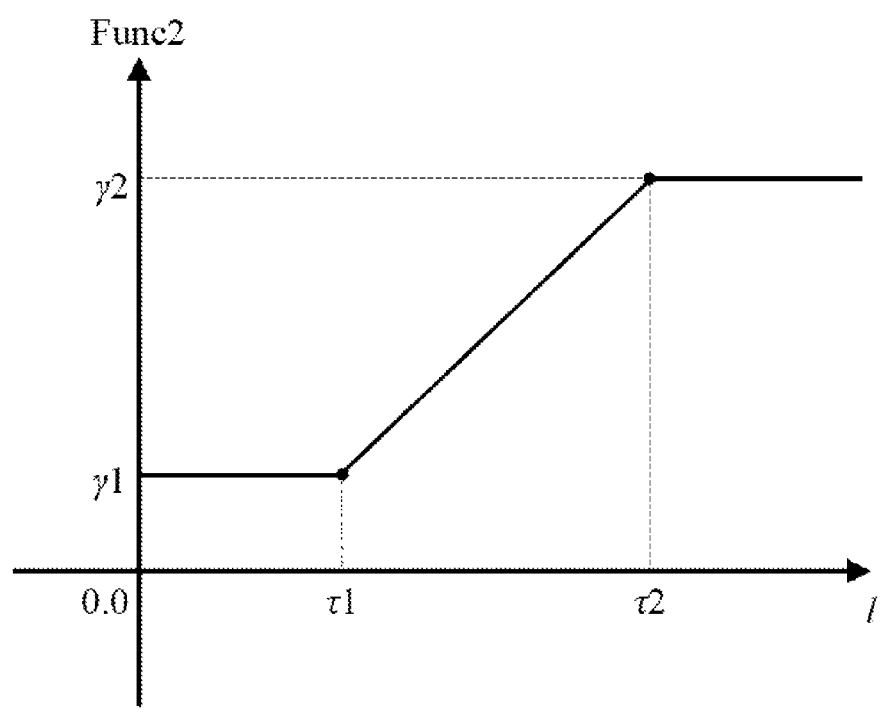
FIG. 3 is a diagram illustrating an example of a form of a recorrection function Func 2 according to the present embodiment.

Here, it is provided that $\tau 1 \leq \tau 2$ and $\gamma 1 \leq \gamma 2$, basically, $0.0 \leq \gamma 1 \leq \gamma 2 \leq 1.0$. A relationship between an input value (1) and an output value in the correction function Func 2 of the formula (10) is illustrated in FIG. 3. In the formula (10), the $\tau 1$ and $\tau 2$ and $\gamma 1$ and $\gamma 2$ may be varied for each layer or may be common to all the layers.

Here, a noise level in each target pixel tends to be dependent on a spatial average of a pixel value of the target pixel and pixel values neighboring the target pixel. In a case where the spatial average of the area that has a range equal to or more than the wide area is smaller (L4 (x, y)<$\tau 1$), the area has such noise performance that noise is easily noticeable in the area.

According to the correction function Func, a difference value between the spatial average of the wide area including the target pixel at a center thereof and the spatial average of the medium area including the target pixel at a center thereof and an edge amount of the area including the target pixel are used to calculate a correction value for the spatial average of the medium area. In the present embodiment, an attention is paid to the above described noise performance, and therefore the correction function Func 2 of the formula (10) is introduced. Accordingly, a correction value for the spatial average of the medium area is calculated based on the spatial average of the area that is wider than the wide area.

In the low-brightness region (L4 (x, y)<$\tau 1$) where noise is easily noticeable, it is possible to improve the noise rejection performance by designing the correction function Func 2 so as to set the correction amount to a large value.

In a sufficiently bright area (L4 (x, y)>$\tau 2$), if $\gamma 2 = 1.0$ is satisfied, characteristics of the correction function Func is reflected to the area as it is.

In an area other than the above ($\tau 1 < 32$ L4 (x, y)<=$\tau 2$), if a correction amount is varied in proportion to the brightness value, adjustment of the noise removal performance becomes possible.

Next, another embodiment will be described.

In another embodiment, the same processing is carried out from the formula (1) to the formula (6).

In another embodiment, the edge amount, e.g., E3 (x, y), that is calculated for each layer according to the formula (6) is reflected to the correction function Flute for suppressing the noise components to thereby change the correction function Func of each layer. This ensures adaptive suppression of the noise components of each layer.

Now, a coefficient β3 (x, y) that varies according to the edge amount E3 (x, y) in a manner as shown in a formula (11) will be defined. The thresholds hi3 and lo3 of the E3 (x, y) are to be set in advance.

$$\beta 3(x, y) = \begin{cases} 0.0 & \text{if } E3(x, y) > hi3 \\ 1.0 & \text{elseif } E3(x, y) < lo3 \\ \frac{E3(x, y) - lo3}{hi3 - lo3} & \text{else} \end{cases} \quad (11)$$

Figure 4:
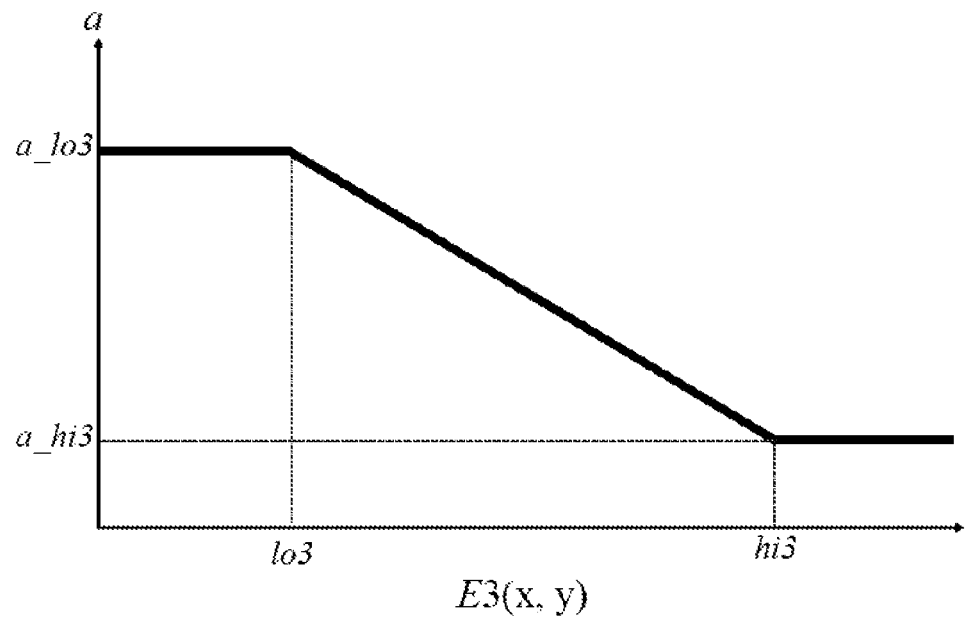
FIG. 4 illustrates an exemplary setting of a parameter a).

The coefficient β3 (x, y) that is defined according to the formula (is a real number within a range between 0 and 1.0. With the use of the coefficient β3 (x, y), the parameter (a) in the correction function Func is set according to the following formula (12). A relationship between the edge amount E3 (x, y) and the parameter (a) is illustrated in FIG. 4.

$$a = \beta(x,y) \times a\_lo3 + (1-\beta(x,y)) \times a\_hi3 \quad (12)$$

Here, a_lo3 is a value to be used as the parameter (a) when the edge amount E3 (x, y) is smaller than the threshold lo3, and a_hi3 is a value to be used as the parameter (a) when the edge amount becomes larger than the threshold hi3. When the edge amount E3 (x, y) falls within a range between the threshold lo3 and the threshold hi3, the parameter (a) will take a value within a range between a_hi3 and a_lo3. Here, a_hi3 is a real number equal to or more than 0, and a_lo3 is a real number satisfying a_lo3>=a_hi3.

A method for obtaining the post-correction spatial average L2' (x, y) in the medium area using thus obtained correction function Func will be realized according to the following formula (13).

$$L2'(x,y)=L3(x,y)+\text{Func2}(L4(x,y),\tau 1,\tau 2,\gamma 1,\gamma 2)\times \text{Func}(L2(x,y)=L3(x,y)) \quad (13)$$

Meanwhile, the above described recorrection function Func 2 is not limited to the formula (10). It is possible to employ, for example, the following formula (14) or formula (15).

$$\text{Func2}(l, \tau 1, \tau 2, \gamma 1, \gamma 2) = \begin{cases} \gamma 2 & \text{if } l > \tau 2 \\ \frac{l}{\tau 1} \times \gamma 1 & \text{else if } l < \tau 1 \\ \left(\frac{l-\tau 1}{\tau 2-\tau 1} \times (\gamma 2 - \gamma 1) + \gamma 1\right) & \text{else} \end{cases} \quad (14)$$

$$\text{Func2}(l, \tau 2, \gamma 2) = \begin{cases} \gamma 2 & \text{if } l > \tau 2 \\ \frac{l}{\tau 2} \times \gamma 2 & \text{otherwise} \end{cases} \quad (15)$$

Figure 5:
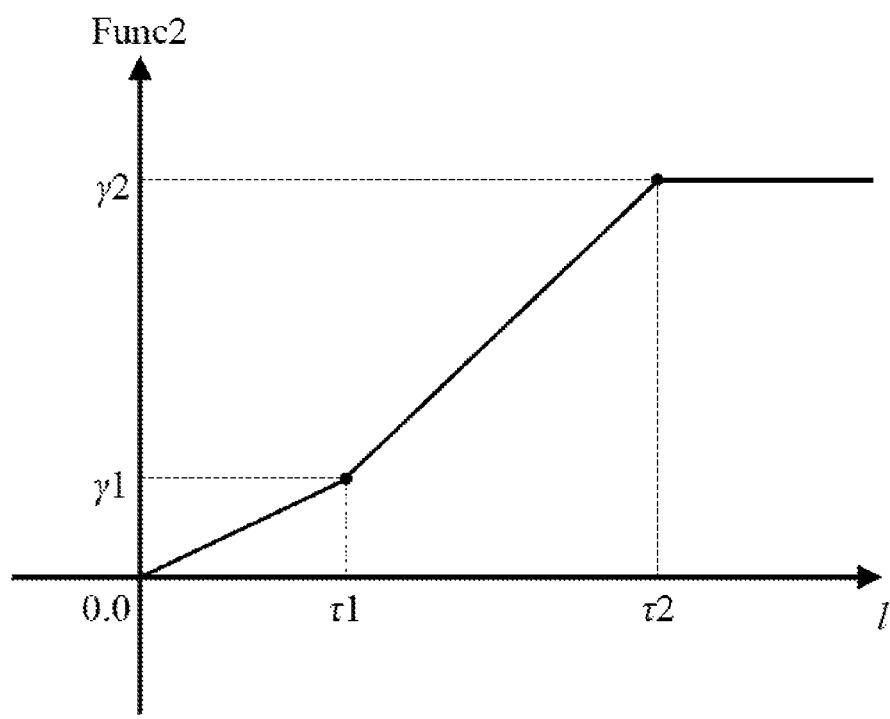
FIG. 5 is a diagram illustrating another example of a form of the recorrection function Func 2 according to the present embodiment.
Figure 6:
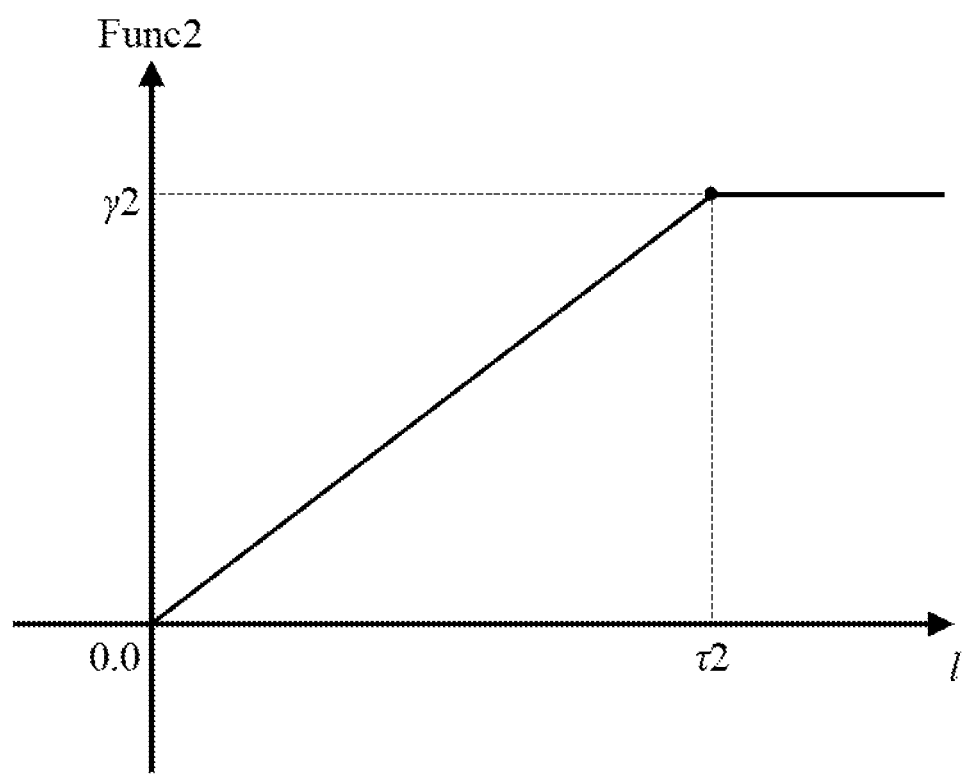
FIG. 6 is a diagram illustrating further another example of a form of the recorrection function Func 2 according to the present embodiment.

A relationship between an input value (1) and a output value in the recorrection function Func 2 shown in the formula (14) and the formula (15) is illustrated in FIG. 5 and FIG. 6, respectively.

Next, an image processing device that realizes the processing according to the above embodiment will be described.

Initially, an image processing device that executes the method for obtaining the correction value using the formula (1) to the formula (10) will be described.

Figure 7:
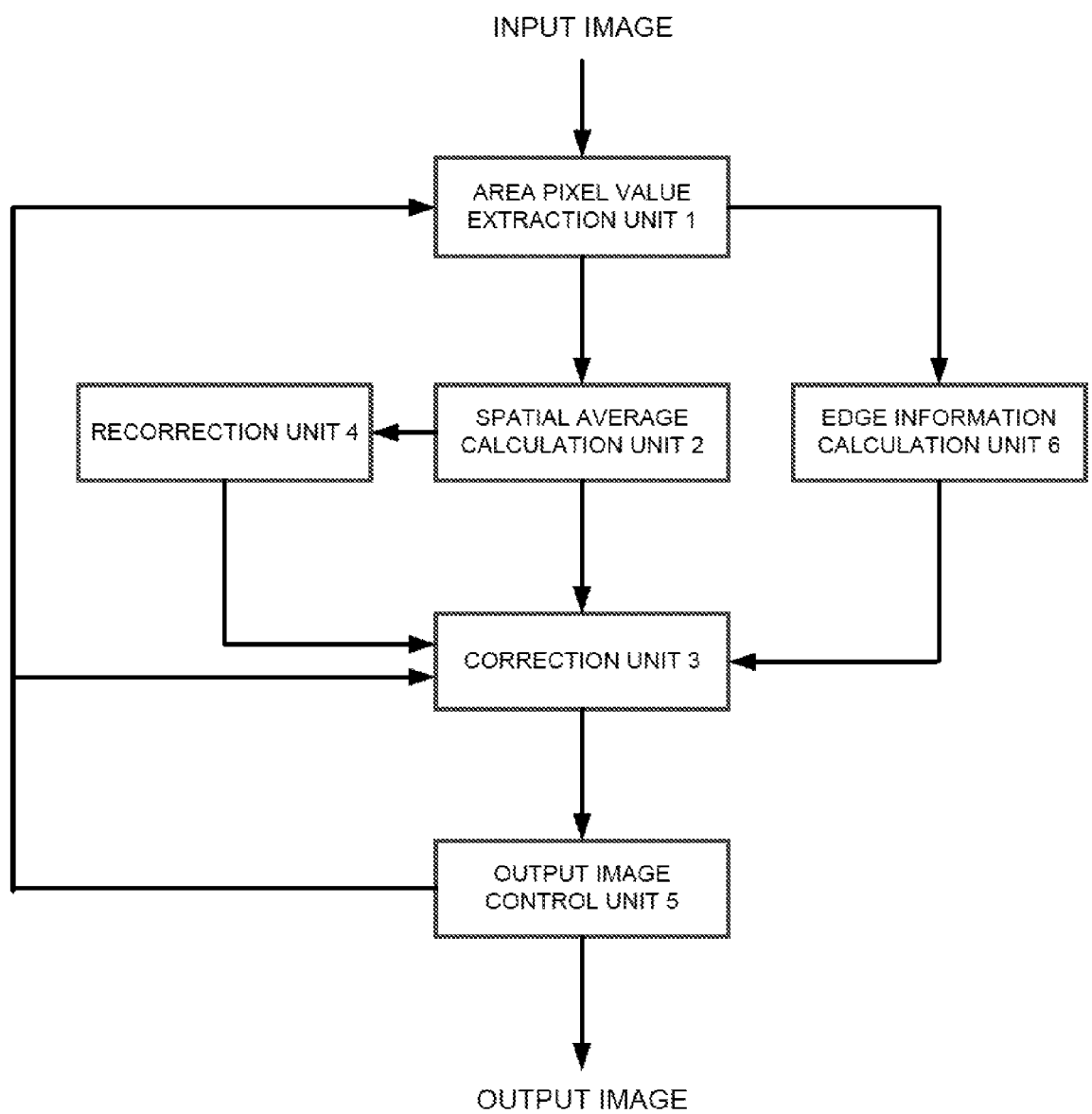
FIG. 7 is a block diagram illustrating an image processing device according to the present embodiment.

FIG. 7 is a block diagram illustrating the image processing device that executes the method for obtaining the correction value using the formula (1) to the formula (10).

The image processing device illustrated in FIG. 7 includes an area pixel value extraction unit 1, a spatial average calculation unit 2, a correction unit 3, a recorrection function calculation unit 4, an output image control unit 5, and an edge information calculation unit 6.

The area pixel value extraction unit 1 extracts the pixel values of pixels in the wide area, the pixel values of pixels in the medium area, the pixel values of pixels in the narrow area, the pixel values of pixels in the area that is wider than the wide area, and the pixel value of the input pixel value $P_{in}$ (x, y) (target pixel) at their respective timings, the areas each including the pixel location (x, y) (target pixel) at a center thereof. Then, the area pixel value extraction unit 1 outputs the extracted values to the spatial average calculation unit 2 and the edge information calculation unit 6, respectively.

The spatial average calculation unit 2 receives the pixel values of each area from the area pixel value extraction unit 1 to calculate the spatial average for each area. The spatial average calculation unit 2 outputs the calculated spatial average of each of the wide area, the medium area, and the narrow area to the correction unit 3. The spatial average calculation unit 2 outputs thus calculated spatial average of the area that is wider than the wide area to the recorrection function calculation unit 4.

The recorrection function calculation unit 4 calculates the recorrection function Func 2 according to the formula (10) based on the spatial average of the area that is wider than the wide area, the spatial average being calculated by the spatial average calculation unit 2. The recorrection function Func 2 is not limited to the formula (10). It is possible to employ, for example, the formula (14) or the formula (15). Alternatively, another formula is also employable so far as the formula has an equivalent function.

The edge information calculation unit 6 calculates the edge amount E3 (x, y) in the wide area based on the pixel values of pixels existing in the wide area, the pixel values being from the area pixel value extraction unit 1. The edge information calculation unit 6 calculates the edge amount in the following manner. The edge information calculation unit 6 calculates the edge amount EV3 (x, y) in the vertical direction and the edge amount EH3 (x, y) in the horizontal direction according to the formula (4) and the formula (5), respectively, and adds the resulting values according to the formula (6) to obtain the edge amount E3 (x, y) in the wide area. The edge information calculation unit 6 calculates the edge amount E2 (x, y) of the medium area and an edge amount E1 (x, y) of the narrow area, respectively, in a similar manner. Meanwhile, the edge amount in the horizontal direction and the edge amount in the vertical direction are calculated here. However, an edge amount in an oblique direction may be calculated for the use here.

The correction unit 3 corrects the spatial average L3 (x, y) in the wide area according to the formula (7) using the composed weight α3 (x, y) obtainable from the edge amount E3 (x, y) that was calculated by the edge information calculation unit 6. Then, the correction unit 3 calculates the post-recorrection spatial average L3" (x, y) of the wide area. Meanwhile, the composed weight α3 (x, y) is calculated according to the formula (8) using the thresholds hi3 and lo3 set in advance.

The correction unit 3 further corrects the spatial average L2 (x, y) of the medium area according to the formula (9) using the obtained spatial average L3" (x, y) and the recorrection function Func 2 that was calculated by the recorrection function calculation unit 4, resulting in obtaining the post-correction spatial average L2' (x, y). The correction unit 3 performs correction for the spatial average L1 (x, y) and the input pixel value $P_{in}$ (x, y), respectively, in a similar manner.

The output image control unit 5 instructs the area pixel value extraction unit 1 to extract pixel values of pixels of an area of the next layer every time when the post-correction spatial averages are sequentially input. Also, every time when the post-recorrection spatial average is input, the output image control unit 5 feeds back the input value to the correction unit 3. Then, when the $P_{out}$ (x, y) of a single pixel is input, the output image control unit 5 outputs the $P_{out}$ (x, y) as an output pixel value.

Next, another image processing device that executes a method for obtaining the correction value using the formula (1) to the formula (6) and the formula (11) to the formula (13) will be described.

Figure 8:
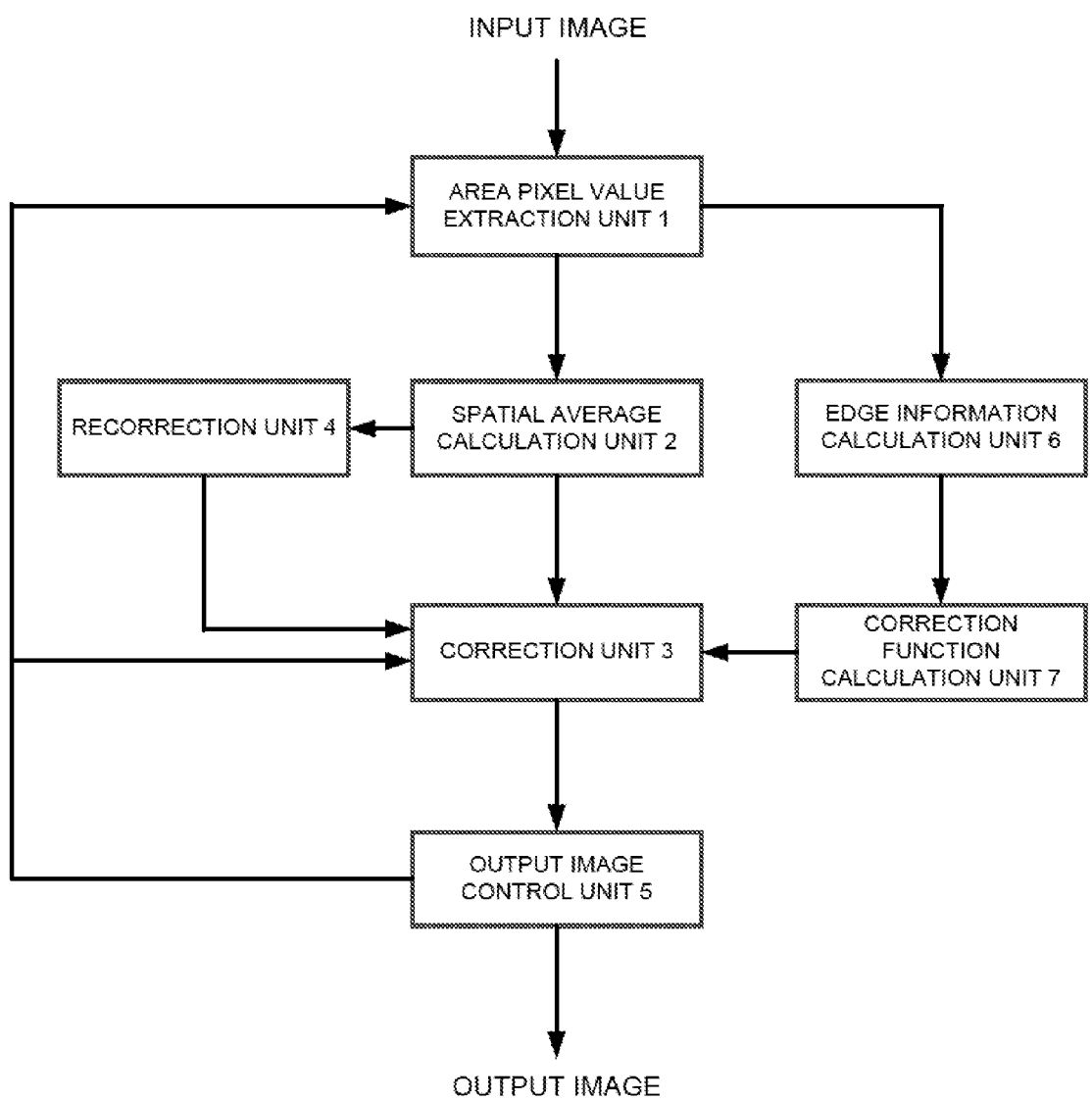
FIG. 8 is a block diagram illustrating another image processing device according to the present embodiment.

FIG. 8 is a block diagram illustrating another image processing device that executes a method for obtaining, the correction value using the formula (1) to the formula (6) and the formula (11) to the formula (13).

The image processing device illustrated in FIG. 8 includes the area pixel value extraction unit 1, the spatial average calculation unit 2, the correction unit 3, the recorrection function calculation unit 4, the output image control unit 5, the edge information calculation unit 6, and a correction function calculation unit 7.

The area pixel value extraction unit 1, the spatial average calculation unit 2, the recorrection function calculation unit 4, the output image control unit 5, and the edge information calculation unit 6 operate in a manner similar to those of the image processing device illustrated in FIG. 7.

The correction function calculation unit 7 calculates the parameter (a) in the correction function Func according to the formula (11) and the formula (12) based on the edge amount that was calculated by the edge information calculation unit 6. Then, the correction function calculation unit 7 calculates the correction function Func for each layer.

The correction unit 3 corrects the spatial average for each layer according to the formula (13) using the correction function Func of each layer that was calculated by the correction function calculation unit 7 and the recorrection function Func 2 that was calculated by the recorrection function calculation unit 4.

As described above, according to the embodiment of the present invention, control of the recorrection amount in the noise suppression based on the brightness information of the area where the target pixel is contained ensures improvement of the noise rejection performance in the low-brightness region where noise components are easily noticeable.

Meanwhile, as apparent from the above description, it is possible to configure each unit with hardware, and it is also possible to achieve the same function with a computer program. In this case, a processor operated by a program that is stored in a program memory realizes a function and an operation equivalent to those of each embodiment described above. Alternatively, it is also possible to realize only a portion of the function of the above described embodiment by the computer program.

The above embodiments can be described partially or in whole according to the following supplementary notes. However, the present invention should not be limited to the following supplementary notes.

(Supplementary note 1) An image processing method including:

calculating a pixel statistical value and edge information of pixels for each of areas of a multi-layer, the areas each containing a target pixel and having a successively decreased range;

correcting difference information between a pixel statistical value of an area of a specific layer and a pixel statistical value of an area of a layer that is wider than the area of the specific layer using the edge information;

correcting the pixel statistical value of the area of the specific layer using post-correction difference information, the pixel statistical value of the area that is wider than the area of the specific layer, and a pixel statistical value of an area that is wider than the areas of other layers; and correcting the target pixel by repeating correction and recorrection of the pixel statistical value of the area of the specific layer successively in each layer until the area reduces its range from the maximum range to the minimum range.

(Supplementary note 2) The image processing method according to supplementary note 1, wherein the correction is performed, when the pixel statistical value of the area of the specific layer is corrected using the post-correction difference information, the pixel statistical value of the area that is wider than the area of the specific layer, and the pixel statistical value of the area that is wider than the areas of other layers, in such a manner that:

a correction amount is set to a large value when the area that is wider than the areas of other layers is an area where a brightness value is smaller than a first value;

correction is not performed when the area that is wider than the areas of other layers is on area where the brightness value is larger than a second value; and the correction amount is set to a value according to the brightness when the area that is wider than the areas of other layers is an area where the brightness value is larger than the first value and smaller than the second value.

(Supplementary note 3) The image processing method according to supplementary note 1 or supplementary note 2, wherein the difference information is calculated using the pixel statistical value of the area of the specific layer, the pixel statistical value of the area of the layer that is wider than the area of the specific layer, and the edge information in the area of the layer that is wider than the area of the specific layer.

(Supplementary note 4) The image processing method according to supplementary note 3, wherein the pixel statistical value of the area of the specific layer is not corrected when the edge information in the area of the layer that is wider than the area of the specific layer exceeds a predetermined threshold.

(Supplementary note 5) The image processing method according to any one of supplementary note 1 to supplementary note 4, wherein a degree of correction is varied for each layer when the pixel statistical value of the area of the specific layer is corrected using post-correction difference information and the pixel statistical value of the area that is wider than the area of the specific layer.

(Supplementary note 6) The image processing method according to supplementary note 5, wherein the degree of correction is varied according to variation amounts of pixel values caused by noise of the area of the specific layer when the pixel statistical value of the area of the specific layer is corrected using the post-correction difference information and the pixel statistical value of the area that is wider than the area of the specific layer.

(Supplementary note 7) The image processing method according to supplementary note 5, wherein the degree of correction is varied according to an edge amount of the area that is wider than the area of the specific layer when the pixel statistical value of the area of the specific layer is corrected using the post-correction difference information and the pixel statistical value of the area that is wider than the area of the specific layer.

(Supplementary note 8) The image processing method according to any one of supplementary note 1 to supplementary note 7, wherein the correction is performed in such a manner that a value close to zero is output as the difference information comes closer to zero, whereas, the degree of correction is made smaller as the difference information becomes larger when the pixel statistical value of the area of the specific layer is corrected using the post-correction difference information and the pixel statistical value of the area that is wider than the area of the specific layer.

(Supplementary note 9) The image processing method according to any one of supplementary note 1 to supplementary note 8, wherein a spatial average of pixels is used as the pixel statistical value.

(Supplementary note 10) The image processing method according to supplementary note 9, wherein the spatial average is any one of an arithmetic mean, a geometric mean, or a weighted average efficiency of pixels.

(Supplementary note 11) An image processing device including:

a pixel statistical value calculation unit calculating a pixel statistical value of pixels for each of areas of a multi-layer, the areas each containing a target pixel and having a successively decreased range;

an edge information calculation unit calculating edge information for each of the areas of the multi-layer, the areas each containing a target pixel and having a successively decreased range; and a correction unit correcting difference information between a pixel statistical value of an area of a specific layer and a pixel statistical value of an area of a layer that is wider than the area of the specific layer using the edge information, correcting the pixel statistical value of the area of the specific layer using post-correction difference information, the pixel statistical value of the area that is wider than the area of the specific layer, and a pixel statistical value of an area that is wider than the areas of other layers, and correcting the target pixel by repeating correction and recorrection of the pixel statistical value of the area of the specific layer sequentially in each layer until the area reduces its range from the maximum range to the minimum range.

(Supplementary note 12) The image processing device according to supplementary note 11, wherein, when performing correction of the pixel statistical value of the area of the specific layer using the post-correction difference information, the pixel statistical value of the area that is wider than the area of the specific layer, and the pixel statistical value of an area that is wider than the areas of other layers, the correction unit performs the correction in such a manner that:

a correction amount is set to a large value when the area that is wider than the areas of other layers is an area where a brightness value is smaller than a first value;

correction is not performed when the area that is wider than the areas of other layers is an area where the brightness value is larger than a second value; and the correction amount is set to a value according to brightness when the area that is wider than the areas of other layers is an area where the brightness value is larger than the first value and smaller than the second value.

(Supplementary note 13) The image processing device according to supplementary note 11 or supplementary note 12, wherein the correction unit calculates the difference information using the pixel statistical value of the area of the specific layer, the pixel statistical value of the area of the layer that is wider than the area of the specific layer, and the edge information in the area of the layer that is wider than the area of the specific layer.

(Supplementary note 14) The image processing device according to supplementary note 13, wherein the correction unit does not correct the pixel statistical value of the area of the specific layer when the edge information in the area of the layer that is wider than the area of the specific layer exceeds a predetermined threshold.

(Supplementary note 15) The image processing device according to any one of supplementary note 11 to supplementary note 14, wherein the correction unit causes the degree of correction to vary for each layer when the pixel statistical value of the area of the specific layer is corrected using post-correction difference information and the pixel statistical value of the area that is wider than the area of the specific layer.

(Supplementary note 16) The image processing device according to supplementary note 15, wherein the correction unit causes the degree of correction to vary according to variation amounts of pixel values caused by noise of the area of the specific layer when the pixel statistical value of the area of the specific layer is corrected using the post-correction difference information and the pixel statistical value of the area that is wider than the area of the specific layer.

(Supplementary note 17) The image processing device according to supplementary note 15, wherein the correction unit causes the degree of correction to vary according to an edge amount of the area that is wider than the area of the specific layer when the pixel statistical value of the area of the specific layer is corrected using the post-correction difference information and the pixel statistical value of the area that is wider than the area of the specific layer.

(Supplementary note 18) The image processing device according to any one of supplementary note 11 to supplementary note 17, wherein the correction unit performs correction in such a manner that a value close to zero is output as the difference information comes closer to zero, whereas, the degree of correction is made smaller as the difference information becomes larger, when the pixel statistical value of the area of the specific layer is corrected using the post-correction difference information and the pixel statistical value of the area that is wider than the area of the specific layer.

(Supplementary note 19) The image processing device according to any one of supplementary note 11 to supplementary note 18, wherein a spatial average of pixels is used as the pixel statistical value.

(Supplementary note 20) The image processing device according to supplementary note 19, wherein the spatial average is any one of an arithmetic mean, a geometric mean, or a weighted average efficiency of pixels.

(Supplementary note 21) A program causing a computer to execute:

pixel statistical value calculation processing for calculating a pixel statistical value of pixels for each of areas of a multi-layer, the areas each containing a target pixel and having a successively decreased range;

edge information calculation processing for calculating edge information for each of the areas of the multi-layer, the areas each containing a target pixel and having a successively decreased range; and correction processing for correcting difference information between a pixel statistical value of an area of a specific layer and a pixel statistical value of an area of a layer that is wider than the area of the specific layer, correcting the pixel statistical value of the area of the specific layer using post-correction difference information, the pixel statistical value of the area that is wider than the area of the specific layer, and a pixel statistical value of an area that is wider than areas of other layers, and correcting the target pixel by repeating correction and recorrection of the pixel statistical value of the area of the specific layer successively in each layer until the area reduces its range from the maximum range to the minimum range.

(Supplementary note 22) The program according to supplementary note 21, wherein, in the correction processing, when the pixel statistical value of the area of the specific layer is corrected using the post-correction difference information, the pixel statistical value of the area that is wider than the area of the specific layer, and the pixel statistical value of the area that is wider than the areas of other layers, the correction is performed in such a manner that:

a correction amount is set to a large value when the area that is wider than the areas of other layers is an area where a brightness value is smaller than a first value;

correction is not performed when the area that is wider than the areas of other layers is an area where the brightness value is larger than a second value; and the correction amount is set to a value according to the brightness when the area that is wider than the areas of other layers is an area where the brightness value is larger than the first value and smaller than the second value (Supplementary note 23) The program according to supplementary note 21 or supplementary note 22, wherein, in the correction processing, the difference information is calculated using the pixel statistical value of the area of the specific layer, the pixel statistical value of the area of the layer that is wider than the area of the specific layer, and edge information in the area of the layer that is wider than the area of the specific layer.

(Supplementary note 24) The program according to supplementary note 23, wherein, in the correction processing, the pixel statistical value of the area of the specific layer is not corrected when the edge information in the area of the layer that is wider than the area of the specific layer exceeds a predetermined threshold.

(Supplementary note 25) The program according to any one of supplementary note 21 to supplementary note 24, wherein, in the correction processing, a degree of correction is varied for each layer when the pixel statistical value of the area of the specific layer is corrected using the post-correction difference information and the pixel statistical value of the area that is wider than the area of the specific layer.

(Supplementary note 26) The program according to supplementary note 25, wherein, in the correction processing, the degree of correction is varied according to variation amounts of pixel values caused by noise of the area of the specific layer when the pixel statistical value of the area of the specific layer is corrected using the post-correction difference information and the pixel statistical value of the area that is wider than the area of the specific layer.

(Supplementary note 27) The program according to supplementary note 25, wherein, in the correction processing, the degree of correction is varied according to an edge amount of the area that is wider than the area of the specific layer when the pixel statistical value of the area of the specific layer is corrected using the post-correction difference information and the pixel statistical value of the area that is wider than the area of the specific layer.

(Supplementary note 28) The program according to any one of supplementary note 21 to supplementary note 27, wherein, in the correction processing, correction is performed in such a manner that a value close to zero is output as the difference information comes closer to zero, whereas, the degree of correction is made smaller as the difference information becomes larger, when the pixel statistical value of the area of the specific layer is corrected using the post-correction difference information and the pixel statistical value of the area that is wider than the area of the specific layer.

(Supplementary note 29) The program according to any one of supplementary note 21 to supplementary note 28, wherein a spatial average of pixels is used as the pixel statistical value.

(Supplementary note 30) The program according to supplementary note 29, wherein the spatial average value is any one of an arithmetic mean, a geometric mean, or a weighted average efficiency of pixels.

The present invention has been described above with reference to the preferred embodiments and examples. The present invention, however, is not always limited to the above embodiments and examples, but may be modified to be carried out in various forms without departing from the technical concept of the present invention.

This application claims the benefit of Japanese Application No. 2012-100911, filed Apr. 26, 2012, the disclosure of which is hereby incorporated by reference.

REFERENCE SIGNS LIST 1 area pixel value extraction unit
2 spatial average calculation unit
3 correction unit
4 recorrection function calculation unit
5 output image control unit
6 edge information calculation unit
7 correction function calculation unit

The invention claimed is:

1. An image processing method comprising:
    calculating a pixel statistical value and an edge information of pixels for each of plural areas of a multi-layer structure to thereby obtain the pixel statistical value and the edge information for each of the areas, each of the areas containing a target pixel and having a successively decreased range;
    a difference information correction step of using the edge information to correct difference information between a pixel statistical value of a first area of a specific layer of the multi-layer structure and a pixel statistical value of a second area of another layer of the multi-layer structure to thereby obtain post-correction difference information, wherein the second area is wider than the first area;
    a recorrection step of recorrecting the post-correction difference information using the pixel statistical value of a third area of the multi-layer structure to thereby obtain recorrected difference information, wherein the third area is wider than the second area;
    a pixel statistical value correction step of correcting the pixel statistical value of the first area using the recorrected difference information and the pixel statistical value of the second area; and
    correcting the target pixel of the first area by successively repeating the recorrection step and the pixel statistical value correction step of the first area until a range of the first area is reduced from a maximum range to a minimum range.

2. The image processing method according to claim 1, wherein the correction is performed, when the pixel statistical value of the first area of the specific layer is corrected using the post-correction difference information, the pixel statistical value of the second area, and the pixel statistical value of the third area, in such a manner that:
    a correction amount is set to a large value when the third area is an area where a brightness value is smaller than a first value;
    correction is not performed when the third area is an area where the brightness value is larger than a second value; and
    the correction amount is set to a value according to the brightness when the third area is an area where the brightness value is larger than the first value and smaller than the second value.

3. The image processing method according to claim 1, wherein the difference information is calculated using the pixel statistical value of the area of the specific layer, the pixel statistical value of the second area, and the edge information in the second area.

4. The image processing method according to claim 3, wherein the pixel statistical value of the first area is not corrected when the edge information in the second area exceeds a predetermined threshold.

5. The image processing method according to claim 1, wherein a degree of correction is varied for each layer when the pixel statistical value of the first area is corrected using post-correction difference information and the pixel statistical value of the second area.

6. The image processing method according to claim 5, wherein the degree of correction is varied according to variation amounts of pixel values caused by noise of the first area when the pixel statistical value of the first area is corrected using the post-correction difference information and the pixel statistical value of the second area.

7. The image processing method according to claim 5, wherein the degree of correction is varied according to an edge amount of the second area when the pixel statistical value of the first area is corrected using the post-correction difference information and the pixel statistical value of the second area.

8. The image processing method according to claim 1, wherein the correction is performed in such a manner that a value close to zero is output as the difference information comes closer to zero, whereas, the degree of correction is made smaller as the difference information becomes larger when the pixel statistical value of the first area is corrected using the post-correction difference information and the pixel statistical value of the second area.

9. The image processing method according to claim 1, wherein a spatial average of pixels is used as the pixel statistical value.

10. The image processing method according to claim 9, wherein the spatial average is any one of an arithmetic mean, a geometric mean, or a weighted average efficiency of pixels.

11. An image processing device comprising:
    a pixel statistical value calculation unit calculating a pixel statistical value of pixels for each of plural areas of a multi-layer structure to thereby obtain the pixel statistical value and the edge information for each of the areas, each of the areas containing a target pixel and having a successively decreased range;

an edge information calculation unit calculating edge information for each of the areas of the multi-layer structure, each of the areas containing a target pixel and having a successively decreased range; and a correction unit that
i) uses the edge information in correcting difference information between a pixel statistical value of a first area of a specific layer and a pixel statistical value of a second area of another layer that is wider than the first area,
ii) recorrecting post-correction difference information using a pixel statistical value of a third area of the multi-layer structure to obtain recorrected difference information, wherein the third area is wider than the second area,
iii) correcting the pixel statistical value of the first area using the recorrected difference information and the pixel statistical value of the second area, and
iv) correcting the target pixel of the first area by successively repeating recorrecting the post-correction difference information and correcting the pixel statistical value of the first area until a range of the first area is reduced from a maximum range to a minimum range.

12. The image processing device according to claim 11, wherein, when performing correction of the pixel statistical value of the first area using the post-correction difference information, the pixel statistical value of the second area, and the pixel statistical value of the third area, the correction unit performs the correction in such a manner that:
a correction amount is set to a large value when the third area is an area where a brightness value is smaller than a first value;
correction is not performed when the third area is an area where the brightness value is larger than a second value; and
the correction amount is set to a value according to brightness when the third area is an area where the brightness value is larger than the first value and smaller than the second value.

13. The image processing device according to claim 11, wherein the correction unit calculates the difference information using the pixel statistical value of the first area, the pixel statistical value of the area of the second layer, and the edge information in the second area.

14. The image processing device according to claim 13, wherein the correction unit does not correct the pixel statistical value of the first area when the edge information in the second area exceeds a predetermined threshold.

15. The image processing device according to claim 11, wherein the correction unit causes the degree of correction to vary for each layer when the pixel statistical value of the first area is corrected using post-correction difference information and the pixel statistical value of the second area.

16. The image processing device according to claim 15, wherein the correction unit causes the degree of correction to vary according to variation amounts of pixel values caused by noise of the first area when the pixel statistical value of the first area is corrected using the post-correction difference information and the pixel statistical value of the second area.

17. The image processing device according to claim 15, wherein the correction unit causes the degree of correction to vary according to an edge amount of the second area when the pixel statistical value of the first area is corrected using the post-correction difference information and the pixel statistical value of the second area.

18. The image processing device according to claim 11, wherein the correction unit performs correction in such a manner that a value close to zero is output as the difference information comes closer to zero, whereas, the degree of correction is made smaller as the difference information becomes larger, when the pixel statistical value of the first area is corrected using the post-correction difference information and the pixel statistical value of the second area.

19. The image processing device according to claim 18, wherein a spatial average of pixels is used as the pixel statistical value.

20. A non-transitory computer readable storage medium storing a program causing a computer to execute:
pixel statistical value calculation processing for calculating a pixel statistical value of pixels for each of plural areas of a multi-layer structure to thereby obtain the pixel statistical value and the edge information for each of the areas, each of the areas containing a target pixel and having a successively decreased range;
edge information calculation processing for calculating edge information for each of the areas of the multi-layer structure, each of the areas containing a target pixel and having a successively decreased range; and
correction processing for
i) using the edge information in correcting difference information between a pixel statistical value of a first area of a specific layer and a pixel statistical value of a second area of another layer that is wider than the first area,
ii) recorrecting post-correction difference information using a pixel statistical value of a third area that of the multi-layer structure to obtain recorrected difference information, wherein the third area is wider than the second area,
iii) correcting the pixel statistical value of the first area using the recorrected difference information and the pixel statistical value of the second area, and
iv) correcting the target pixel of the first area by successively repeating recorrecting the post-correction difference information and correcting the pixel statistical value of the first area until a range of the first area is reduced from a maximum range to a minimum range.

* * * * *